Figure 1:
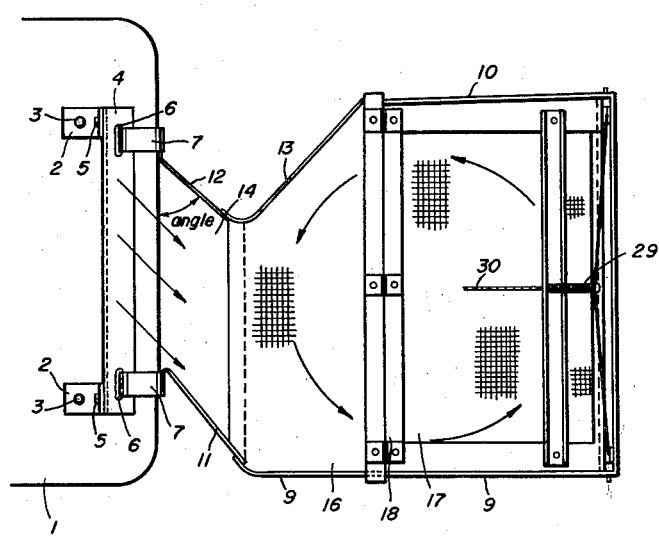

Oct. 29, 1963  F. GERCKE  3,108,420
LAWN MOWER GRASS CATCHER
Filed Feb. 13, 1961  2 Sheets-Sheet 1

INVENTOR.
FERDINAND GERCKE
BY
ATTORNEY

Oct. 29, 1963   F. GERCKE   3,108,420
LAWN MOWER GRASS CATCHER
Filed Feb. 13, 1961   2 Sheets-Sheet 2

INVENTOR.
FERDINAND GERCKE
BY Albert H. Graddis
ATTORNEY

United States Patent Office 3,108,420
Patented Oct. 29, 1963

3,108,420
LAWN MOWER GRASS CATCHER
Ferdinand Gercke, 5 Devon Sedgefield,
Morris Plains, N.J.
Filed Feb. 13, 1961, Ser. No. 88,726
1 Claim. (Cl. 56—205)

The present invention relates to a new and novel receptacle adapted to be employed in conjunction with a rotary blade lawn mower and to collect the grass cuttings and debris thrown from said rotary mower by the centrifugal force and air currents set up by the rotation of the cutter blade at high speed.

An object of this invention is to provide a sturdy, light weight receptacle which may be conveniently mounted on or attached to a rotary lawn mower for receiving the grass cuttings and debris discharged from said mower when in operation.

Another object of this invention is to provide such a receptacle for a rotary lawn mower which is adapted to receive said cuttings and debris and to pack or bale said cuttings and debris into said receptacle so that the full capacity of said receptacle is utilized.

A further object of this invention is the provision of a receptacle for use in conjunction with a rotary mower which can be quickly, easily and completely discharged when full or even partially full by a latching mechanism under direct control of the operator.

Other objects of this invention will appear from the following detailed description and the accompanying drawing.

Figure 2:
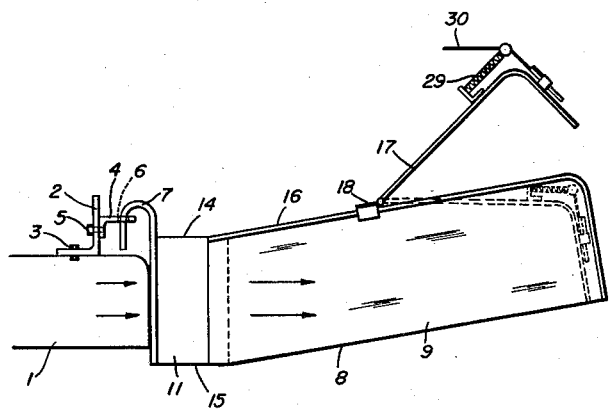
Figure 3:
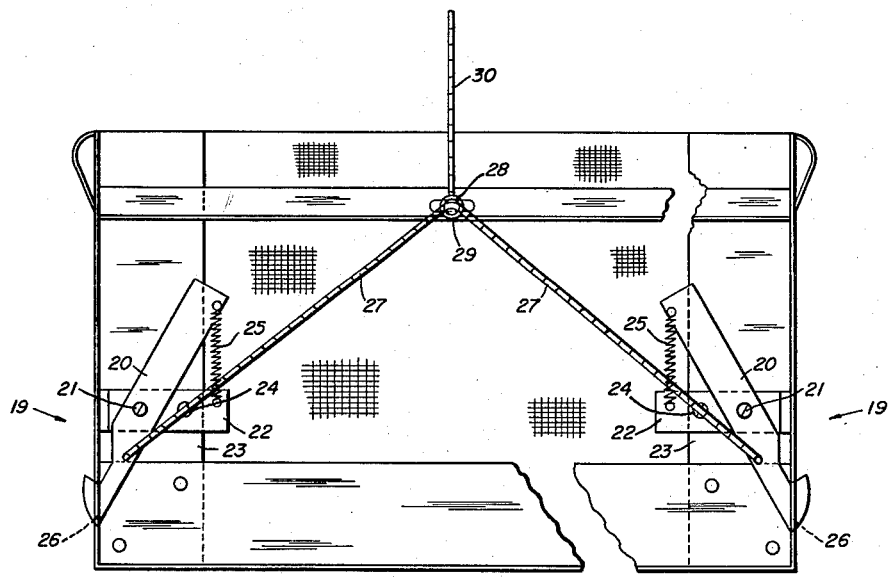
Figure 4:
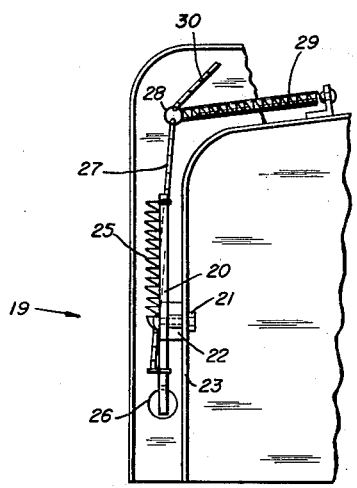

In the drawing,

FIG. 1 is a plan view of a rotary mower equipped with the receptacle of this invention showing the receptacle mounting means as well as the throat and baffle arrangement for directing the flow of grass cuttings and debris discharged from said mower, FIG. 2 is a side-elevational view of said receptacle and mounting means provided therefor showing the latched discharge means in open position, FIG. 3 is a front elevational view of said receptacle partly broken away showing the latching arrangement for said discharge means but in an enlarged scale, and FIG. 4 is a side-elevational view of said latching means showing the control means by which the latching arrangement is operated in an enlarged scale.

Like numerals indicate like parts throughout the several views of the drawing.

Referring now to the drawing, and more particularly to FIG. 1, the rotary mower on which the receptacle of this invention is mounted is generally indicated by reference numeral 1. The mount provided comprises L-shaped brackets 2 bolted or riveted to the mower at 3 and carrying a horizontally mounted plate 4 bolted or riveted thereto at 5. Plate 4 is provided with a pair of generally elongated holes 6 through which are passed inverted U-shaped brackets 7 which are integral with and form a structural part of said receptacle so that the latter may be easily and quickly mounted on or demounted from mower 1 by either placing brackets 7 in holes 6 or removing said brackets therefrom. Holes 6 and bracket 7 act together to form the fulcrum about which the receptacle may be pivoted thus enabling it to be placed in an inoperative position by tilting upward or in operative position by tilting downward where it rests in the position shown in FIG. 2.

The receptacle of my invention comprises a base 8 forming the bottom of said receptacle having side walls 9 and 10 attached thereto said side walls being integral with baffles 11 and 12 which together form the throat of said receptacle through which the cuttings and debris enter. Baffles 11 and 12 are at an angle of 45 to 55° to that diameter of the circle of rotation of the mower blade in the normal line of forward movement of the mower. The forward baffle 12 of the throat is preferably in a line substantially tangent to the periphery of the circle of rotation of the mower blade. Baffle 11 is attached to side wall 9 while baffle 12 is connected to side wall 10 through a second baffle 13 and disposed at substantially a right angle to the line of direction of baffles 11 and 12. The throat is enclosed by means of a top 14 and bottom 15.

The receptacle is provided with a suitable mesh top 16 part of which comprises the discharge means consisting of a latched mesh gate 17 pivotally mounted on the receptacle by means of a hinge 18. In operation, gate 17 is normally held in closed position as shown in FIG. 1 (and in the dotted line portion of FIG. 2) by means of a latch mechanism, generally indicated by reference numeral 19 shown more particularly in FIGS. 3 and 4. Latch mechanism 19 comprises a pair of detents 20 each pivotally mounted to rotate about a bolt 21 threaded into a supporting bracket 22 attached to a portion of the frame 23 of gate 17 by bolts 21 and 24. Detents 20 are spring-loaded to be held in latched position by a pair of stretched coil springs 25 normally held under tension by having one end of each anchored in bracket 22 and the other in the opposite end of detent 20 thus maintaining each detent 20 securely in latched position in holes 26 provided in the end of the frame forming the edge of vertical walls 9 and 10 respectively.

In order to open gate 17 at will a draw chain 27 is provided each end being attached to one of the detents 20 with the center passing through a slide ring 28 which is attached to one end of a spring 29. Ring 28 is further attached to pull chain 30. Thus, to open gate 17 pull chain 30 is drawn upwardly and this action carries slide ring 28 up with it and against the pull of spring 29. Ring 28 centers itself on chain 27 and at the same time exerts a pull on chain 27 thus causing chain 27 to pivot detents 20 against the action of springs 25 and to withdraw them from holes 26. The tension still being exerted on chain 27 and chain 30 after detents 20 are released causes gate 17 to be lifted upward and upon pivoting backward on hinge 18 the contents of the receptacle are readily discharged. To close the discharge gate 17, chain 30 is merely released and gravity causes gate 17 to fall and cause detents 20 to lock in position in holes 26 under the tension of springs 25.

In addition to the improved discharge means with which the receptacle of my invention is provided, which discharge means can be safely operated by remote control with the mower either in operation or halted, the particular throat arrangement is also highly efficient and effective. By this arrangement the full effect of the centrifugal force of the debris discharged into the receptacle by the mower is employed to pack the debris into the receptacle to full capacity without permitting any empty or unfilled corners to be created. Thus, the maximum capacity is always utilized and to discharge the receptacle merely requires the lifting of the discharge gate as described by the effective remote control means provided.

It is understood that the foregoing detailed description is given merely by way of illustration and that many variations may be made therein without departing from the spirit of my invention.

Having described my invention, what I desire to secure by Letters Patent is:

A receptacle adapted to be attached to a lawn mower having a rotary cutting blade and to receive the cuttings discharged therefrom, comprising in combination a base, side walls, an end wall and a top, said receptacle being connected to the discharge opening of said rotary mower by means of a throat opposite the end wall of said receptacle and having substantially parallel upright walls angled toward the mower on a line substantially tangent to the circle of rotation of said mower blade, said end wall comprising a releasably mounted latched gate, wherein the latching mechanism for said gate comprises a pair of spring-loaded detents normally holding said gate in locked position, said detents being provided with means allowing said detents to be simultaneously withdrawn from locked position and to allow said gate to be opened, said means comprising a self-centering pull attached to said detents.

References Cited in the file of this patent

UNITED STATES PATENTS

| | | |
|---|---|---|
| 1,153,383 | Hasseries | Sept. 14, 1915 |
| 2,595,420 | Smola | May 6, 1952 |
| 2,783,604 | Cahill | Mar. 5, 1957 |
| 2,851,844 | Bailey | Sept. 16, 1958 |